US006955008B2

(12) United States Patent
Rose

(10) Patent No.: US 6,955,008 B2
(45) Date of Patent: Oct. 18, 2005

(54) AERATING BASE PLATE FOR A FLOWERPOT

(76) Inventor: Andrew D. Rose, 8813 E. Charter Oak Dr., Scottsdale, AZ (US) 85260

( * ) Notice: Subject to any disclaimer, the term of this patent is extended or adjusted under 35 U.S.C. 154(b) by 345 days.

(21) Appl. No.: 10/193,027

(22) Filed: Jul. 11, 2002

(65) Prior Publication Data

US 2002/0174599 A1 Nov. 28, 2002

Related U.S. Application Data

(63) Continuation of application No. 09/591,282, filed on Jun. 9, 2000, now abandoned.

(51) Int. Cl.$^7$ .................... A01G 9/02
(52) U.S. Cl. .................... 47/80
(58) Field of Search .................... 47/65.6, 71, 79, 47/81, 48.5, 80

(56) References Cited

U.S. PATENT DOCUMENTS

| | | | |
|---|---|---|---|
| 603,492 | A | 4/1898 | Waterer |
| 611,523 | A | 9/1898 | Springer |
| 1,601,259 | A | 9/1926 | Pettigrew |
| 1,627,890 | A | 5/1927 | Ellis |
| 1,952,597 | A | 3/1934 | Lizzola |
| 2,058,934 | A | 10/1936 | Yohe |
| 2,081,337 | A | 5/1937 | Lockyer |
| 2,484,909 | A | 10/1949 | Ritter |
| 3,243,919 | A | 4/1966 | Carlson |
| 4,027,429 | A | 6/1977 | Georgi |
| 4,077,159 | A | 3/1978 | Haglund |
| 4,173,097 | A | 11/1979 | Staby |
| D255,555 | S | 6/1980 | Smith |
| 4,339,891 | A | 7/1982 | Bassett |
| 4,446,652 | A | 5/1984 | Anderson |
| 4,860,491 | A | 8/1989 | Panuski |
| 4,962,613 | A | 10/1990 | Nalbandian |
| 5,058,319 | A | 10/1991 | Liao |
| 5,099,609 | A | 3/1992 | Yamauchi |
| 5,209,013 | A | 5/1993 | Sellers |
| D352,479 | S | 11/1994 | Carlson |
| D352,480 | S | 11/1994 | Carlson |
| D382,512 | S | 8/1997 | Hulsebus |
| 5,782,035 | A | 7/1998 | Locke et al. |
| 6,182,394 | B1 | 2/2001 | Bassler |

*Primary Examiner*—Son T. Nguyen
(74) *Attorney, Agent, or Firm*—Franklin L. Gubernick

(57) ABSTRACT

An aerating base plate designed for placement in the bottom of a conventional plant receptacle, such as a flowerpot. The plate has a sidewall that extends downwardly from the perimeter of a convex top. The top includes a number of perforations that function to enable water and air to flow into, or out of, an interior area of the plate. The plate's sidewall features a number of openings that also enable water and air to flow into, or out of, the plate's interior area. The sidewall's openings are sufficiently small so that they substantially prevent any flow of soil into the plate's interior area.

24 Claims, 5 Drawing Sheets

AERATING BASE PLATE FOR A FLOWERPOT

This application is a Continuation of patent application Ser. No. 09/591,282 that was filed on Jun. 09, 2000, now abandoned.

FIELD OF THE INVENTION

The invention is in the field of potting accessories. More particularly, the invention is a base plate adapted for insertion into the interior of an empty flowerpot. In use, the plate is placed atop the interior surface of the bottom of the pot and is then covered with soil. A semi-enclosed area beneath the plate's top surface will then function to enable proper drainage and aeration of the soil within the pot.

The design of the plate allows it to be used in most conventional pots, irrespective of the existence or location of any drain holes. The plate can be used in any pot that has a maximum interior diameter/width equal to, or greater than, the maximum diameter/width of the plate.

BACKGROUND OF THE INVENTION

There are a number of different types of receptacles that may be used for holding a growing plant. Examples of such receptacles include window boxes, square or rectangular planters, and frusto-conical and cylindrical flowerpots.

Most plant receptacles will typically feature one or more drain holes to enable water to drain from the soil contained within the receptacle. The drain hole(s) also function to provide a flow path for air into, or out of, the bottom of the receptacle. To effectively achieve these functions, the drain hole(s) must be located in, or proximate, the bottom of the receptacle.

A significant problem experienced with the above-described prior art plant receptacles results from the manner in which the drain hole(s) are covered. Prior to filling the receptacle with soil, it is a common practice to place pot shards or stones within the receptacle to partially cover the drain hole(s). These objects function to prevent the soil within the receptacle from escaping via the hole(s). However, if a drain hole is excessively covered, the roots will rot due to insufficient drainage and aeration. If too little of a drain hole is covered, a significant amount of soil may escape from the receptacle.

In an effort to overcome the above-noted problem, it is known in the art to employ a specially-designed plant receptacle system. The system includes a unique plant receptacle and a shaped plastic plate. The plate fits within the receptacle and sits above the receptacle's drain hole. The plate features a plurality of downwardly-extending support legs that are received within complementary sockets in the receptacle's bottom surface. When the receptacle is filled with soil and a user applies water to the surface of the soil, perforations in the plate's top surface allow the water to flow through the plate. The water can then exit the receptacle via the receptacle's drain hole. The plate's perforations are of a small enough size to substantially prevent the flow of soil through the plate.

One important aspect of the above-described system is that the plate's diameter must exactly match the inner diameter of the receptacle, as measured at a point just above the receptacle's bottom surface. If a tight fit is lacking, the soil will flow past the perimeter of the top of plate, travel beneath the plate, and then escape the receptacle via the drain hole. This effectively prevents the use of the plate in any conventional plant receptacle where there would be a gap between the receptacle's sidewall and the perimeter of the plate.

While most plant receptacles having one or more drain holes, this is not the case for plant receptacles that are "self-watering." A self-watering plant receptacle has no drain holes and instead features a dedicated liquid reservoir and a wick structure that functions to deliver the water from the reservoir into the soil above the reservoir. The advantage of a self-watering receptacle is that frequent watering of the plant is not required. Once a user fills the reservoir, the receptacle will maintain the soil in a moist state for an extended period of time. However, this type of receptacle can be quite expensive and may therefore not be readily available and/or practical.

SUMMARY OF THE INVENTION

The invention is an aerating base plate for a plant receptacle. The design of the plate allows it to be used in any conventional plant receptacle that has a maximum inner diameter/width equal to, or greater than, the maximum outer diameter/width of the plate. In the preferred manner of use, the plate is positioned in the bottom of the plant receptacle.

The plate is preferably circular in shape and has a convex top portion that includes a large number of perforations. The perforations extend completely through the top portion. Preferably, located amidst the perforations, are a number of elongated openings that also extend completely through the top portion. The perforations, as well as the elongated openings, are sized to permit the flow of liquid and air through the plate, while substantially preventing any flow of soil.

The plate also includes a sidewall that extends downwardly, preferably at an outward angle, from the perimeter of the plate's top portion. The sidewall is preferably relatively thin and has a height of about one to three inches. At intervals along the length of the sidewall are narrow thru-openings that provide access to the area within the plate. Each opening is formed in the bottom edge of the sidewall, and is sized to permit the flow of liquid and air while substantially blocking any flow of soil. In the preferred embodiment, the openings are grouped in sets of three, and the sets are regularly spaced along the length of the sidewall.

The sidewall functions to elevate the plate's top portion above the bottom surface of the receptacle. As a result, a drainage and ventilation area is created within the plant receptacle beneath the top portion of the plate. The narrow openings in the sidewall allow water to flow between the drainage and ventilation area and any soil that is located between the plate's sidewall and the inner surface of the receptacle's sidewall. Instead of a large volume of water collecting in the soil, the water will collect in the drainage and ventilation area. In pots that have one or more drain holes, the water can then exit said area by flowing or evaporating out of the receptacle via the receptacle's drain hole(s). In a plant receptacle that does not have any drain holes, use of the plate will create a combination drainage/ventilation area and fluid reservoir in the bottom of the receptacle. The soil located adjacent the plate's sidewall will act to wick the water upwardly into the soil above the plate.

The large volume of air in the drainage and ventilation area created by the plate facilitates upward aeration of the soil within the receptacle. In pots that feature one or more drain holes, this functionality is enhanced since a flow path for air is created between the drain hole(s) and the drainage and ventilation area located beneath the top of the plate. In the preferred manner of use, the maximum height of the plate will be greater than the height of any drip pan or saucer into which the receptacle is placed. This will result in there always being an air pocket within the plate's drainage and ventilation area. This air pocket will prevent, or at least minimize, any damage to the plant's roots that would result from overwatering of the plant.

Therefore, in plant receptacles having one or more drain holes, the base plate avoids or minimizes the need to partially block the receptacle's drain hole(s) with pot shards or stones. In a receptacle without drain holes, use of the base plate can enable a self-watering functionality for the receptacle whereby a fluid reservoir, substantially isolated from the plant's roots, is created within the receptacle. As a result, the base plate, in accordance with the invention, can be employed in most types of plant receptacles to provide improved drainage and ventilation at a low cost.

DETAILED DESCRIPTION OF THE DRAWINGS

Figure 1:
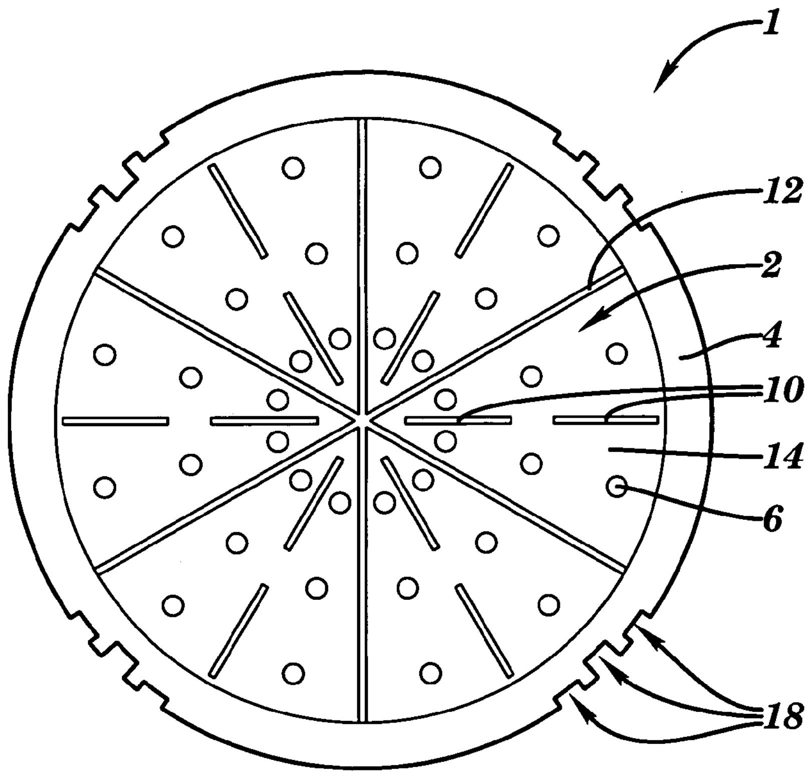
FIG. 1 is a plan view of an aerating base plate in accordance with the invention.
Figure 2:
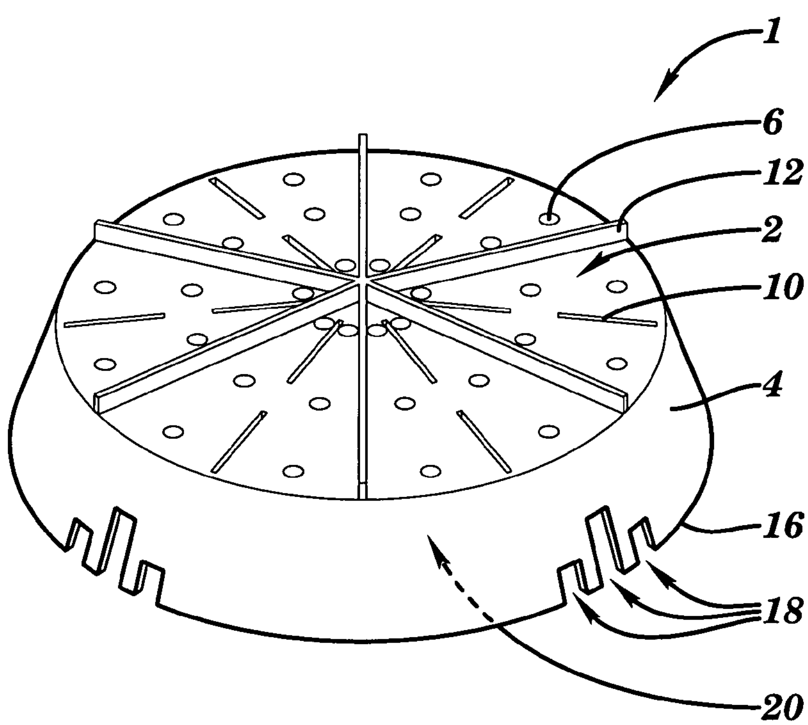
FIG. 2 is a perspective view of the plate shown in FIG. 1.

Referring now to the drawings in greater detail, wherein like numbers refer to like parts throughout the several figures, there is shown by the numeral 1 an aerating base plate in accordance with the invention.

The plate 1 is preferably circular in shape. The plate may alternatively be of any other shape, including square, rectangular, oval, etc. The plate includes a top portion 2 and a circular sidewall 4. In the preferred embodiment, the plate is about three to sixteen inches in diameter and is made of a plastic material, such as PVC, PETG, polyurethane, or styrofoam. When a material such as PVC is used, the thickness of the plate's top portion and sidewall would be approximately one-eighth to one-quarter of an inch. Alternatively, the plate can be made of other materials, including ceramic or metal. While a rigid material is preferred, a semi-flexible material can also be employed.

The plate's top portion 2 is preferably convex and includes a number of perforations in the form of circular openings 6 that extend completely through said portion. Each of the openings 6 is preferably one-eighth to one-quarter of an inch in diameter.

Also located in the plate's top portion 2 are a number of elongated openings 10. These openings extend completely through portion 2. In the preferred embodiment, each of the openings 10 has a length of about one to two inches and a width of about one-sixteenth to one-quarter of an inch.

To separate the plate into discrete areas, to break up the soil, to add strength, and to help direct water flow, a number of ribs 12 are employed. The ribs extend upwardly from the top surface 14 of the plate's top portion 2. Each rib has a height of approximately one-quarter of an inch and a length that is equal to, or slightly less than, the radius of the top portion 2. It should be noted that the ribs are optional, and while six ribs are shown, a fewer or greater number of ribs may be employed.

The plate's sidewall 4 extends downwardly, at an outward angle, from the perimeter of the top portion 2. In the preferred embodiment, the sidewall's height, the distance from the sidewall's bottom edge 16 to the top of the sidewall, is preferably in the range of approximately three-quarters of an inch to three inches.

A number of flow channels, in the form of openings 18, are spaced along the length of the sidewall. Each opening is preferably in the shape of a rectangular slot, and has a width of approximately one-eight to one-quarter of an inch and a height of approximately one-quarter of an inch to one inch. Other shapes and/or sizes of openings may alternatively be employed, as long as the openings 18 are sufficiently narrow to prevent the passage of a substantial amount of soil when the plate is in use.

As shown, the openings 18 are grouped in sets of three. The sets of openings are equidistantly spaced along the length of the sidewall. Since each opening is relatively narrow in order to substantially prevent the passage of soil, there is the possibility that at least one of the openings could become clogged by a stone or by a piece of plant matter. Having sets of multiple openings negates this problem since the redundancy of openings in each area enables adequate drainage even if one or two of the openings in each set becomes clogged. While four sets of openings 18 are shown, a greater or fewer number of sets of openings 18 may be employed. Preferably, there is one set of openings for each approximately four linear inches of sidewall. It should be noted that while sets of openings 18 are preferred, non-grouped openings 18 may also be employed.

The basic function of each flow channel/opening 18 is to provide a flow path for air and/or water into, or out of, a drainage and ventilation area 20 located within the plate 1. The top portion 2 of the plate forms the top boundary for area 20, while the plate's sidewall 4 provides a side boundary for the area. When the plate is installed in a plant receptacle, the bottom boundary of area 20 is formed by the upper surface of the bottom of said receptacle.

FIGS. 3–6 show how the base plate 1 would function in different types of commonly available plant receptacles.

Figure 3:
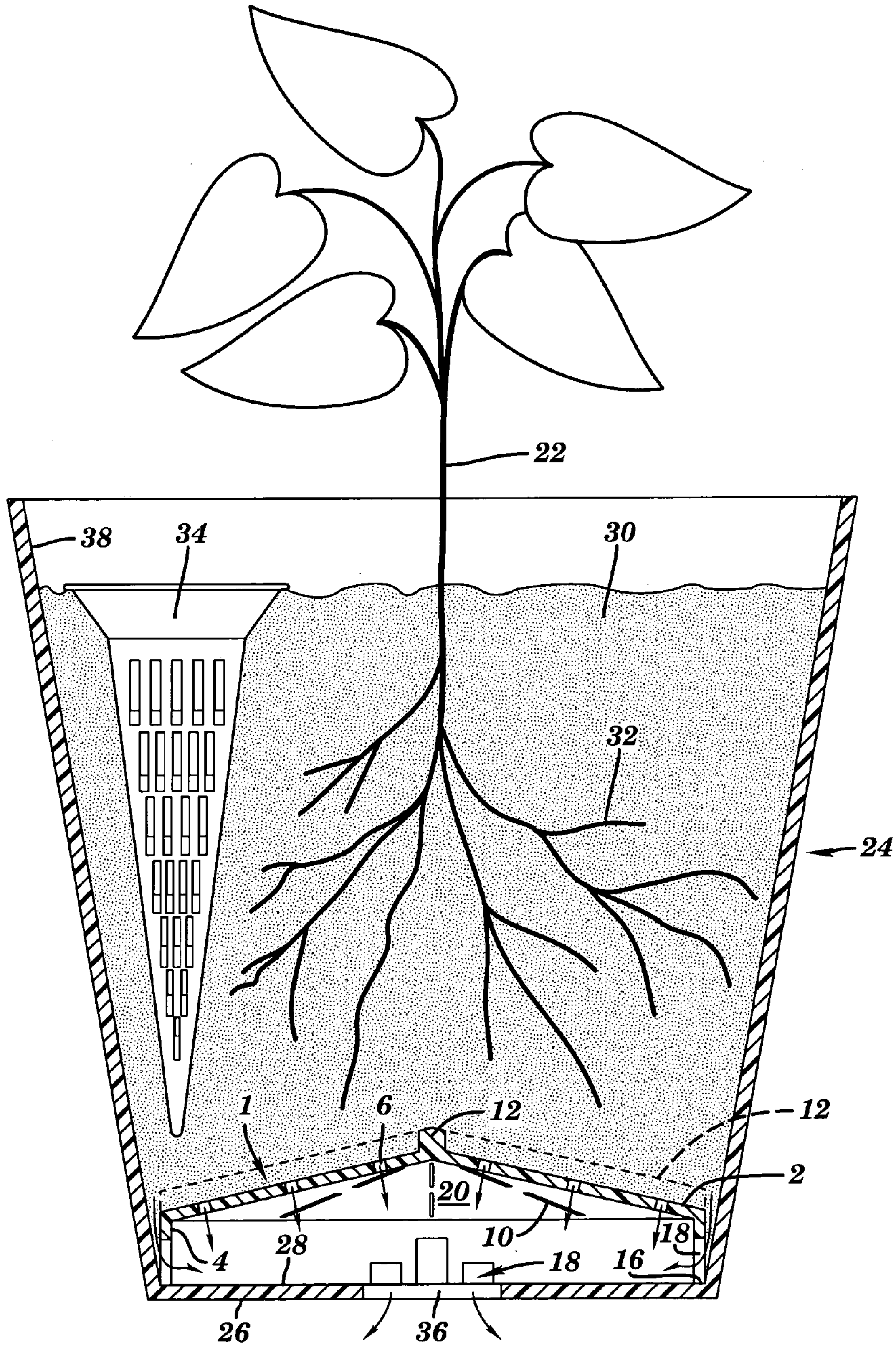
FIG. 3 provides a cross-sectional view of a potted plant, wherein the plate shown in FIG. 1 is located within the pot, and the pot features a center drain hole.

FIG. 3 provides a cross-sectional view of a potted plant 22. The base plate 1 is located within the interior area of a plant receptacle 24, and is therefore also shown in cross-section. As can be seen in the figure, the plate 1 sits atop the flat base 26 of the receptacle, with the bottom edge 16 of the plate's sidewall 4 contacting the top surface 28 of the receptacle's base. As also shown in the figure, the plant receptacle includes a quantity of soil 30 located atop the plate's top portion 2, as well as adjacent the plate's sidewall 4. The plant's roots 32 are shown dispersed through the soil.

A hollow, perforated watering spike 34 is shown inserted in the soil to enhance the aeration of the soil and to facilitate watering of the plant. A full description of the spike may be found in U.S. Pat. No. 5,692,338. The spike is optional, but in conjunction with the base plate 1, creates an improved potting system that may be employed in almost any conventional plant receptacle.

The receptacle 24 features a center-located drain hole 36. When a person waters the plant, the water will travel downwardly through the soil 30. When the water reaches the top portion 2 of the base plate 1, it will pass through said top portion via the openings 6 and 10. Any water located adjacent the plate's sidewall 4 will enter the interior area 20 of the plate by passing through one or more of the openings 18, as shown by the arrows in the figure. Once any water is within area 20, it can then exit the plant receptacle via the drain hole 36. At the same time, ambient air can ventilate/aerate the soil by traveling upwardly through the drain hole, through the area 20 within the plate 1, and then into the soil via the openings 6, 10 and 18. Air can also travel downwardly through the soil, following the same flow path as previously described for water drainage. It should be noted that in this figure, the maximum width/diameter of the plate is approximately equal to the maximum width/diameter of the receptacle's interior area in the area adjacent the plate. Alternatively, but not shown, the same plate 1 could be employed in a bigger receptacle of the same type, whereby a larger gap would exist between the plate's sidewall and the receptacle's sidewall.

Figure 4:
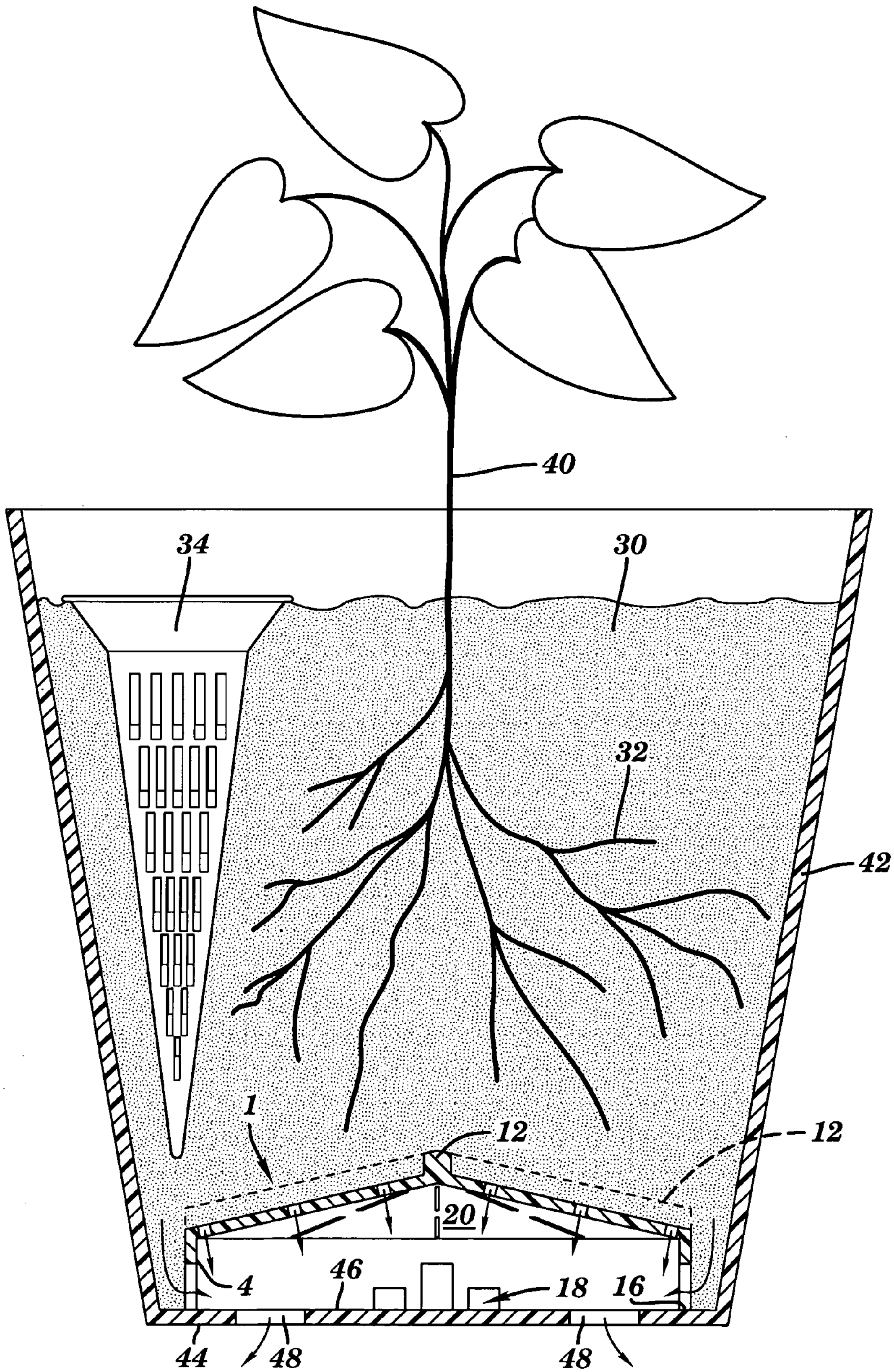
FIG. 4 provides a cross-sectional view of a potted plant, wherein the plate shown in FIG. 1 is located within the pot, and the pot features a plurality of drain holes located in its base.

FIG. 4 provides a cross-sectional view of another potted plant 40. Again, the aerated base plate 1 is contained within the plant receptacle 42, and is therefore shown in cross-section. As can be seen in the figure, the plate 1 sits atop the receptacle's flat base 44, with the bottom edge 16 of the plate's sidewall 4 contacting the top surface 46 of the base. The receptacle also contains a quantity of soil 30 located atop the plate's top surface 2, as well as adjacent the plate's sidewall 4. The plant's roots 32 are shown dispersed through the soil. As in the previous figure, an optional watering spike 34 is shown inserted in the soil to enhance the aeration of the soil and to facilitate watering of the plant.

A plurality of drain holes 48 are located in the receptacle's base 44. It should be noted that in this figure, the maximum width/diameter of the plate is less than the maximum width/diameter of the receptacle's interior area in the area adjacent the plate. Alternatively, but not shown, the same plate 1 could be employed in a smaller receptacle of the same type, whereby a gap may not exist between edge 16 of the plate's sidewall and the receptacle's sidewall.

As in the previous embodiment, when a person waters the plant located within the receptacle 42, the water will initially travel through the soil. The water located atop the top portion of the plate 1 will pass through the openings 6 and 10 in the plate's top portion, enter the area 20 within the plate, and then exit the receptacle via the drain holes 48. Any water in the soil adjacent the base plate's sidewall 4 can enter area 20 via one or more of the openings 18, and then exit the receptacle via the drain holes 48.

The aeration/ventilation of the soil within the plant receptacle 42 can follow the same path, or a reverse path, as previously described for the water drainage. For example, the air can enter the pot via the drain holes 48, and then flow into the soil by flowing through the openings 6, 10 and 18.

Figure 5:
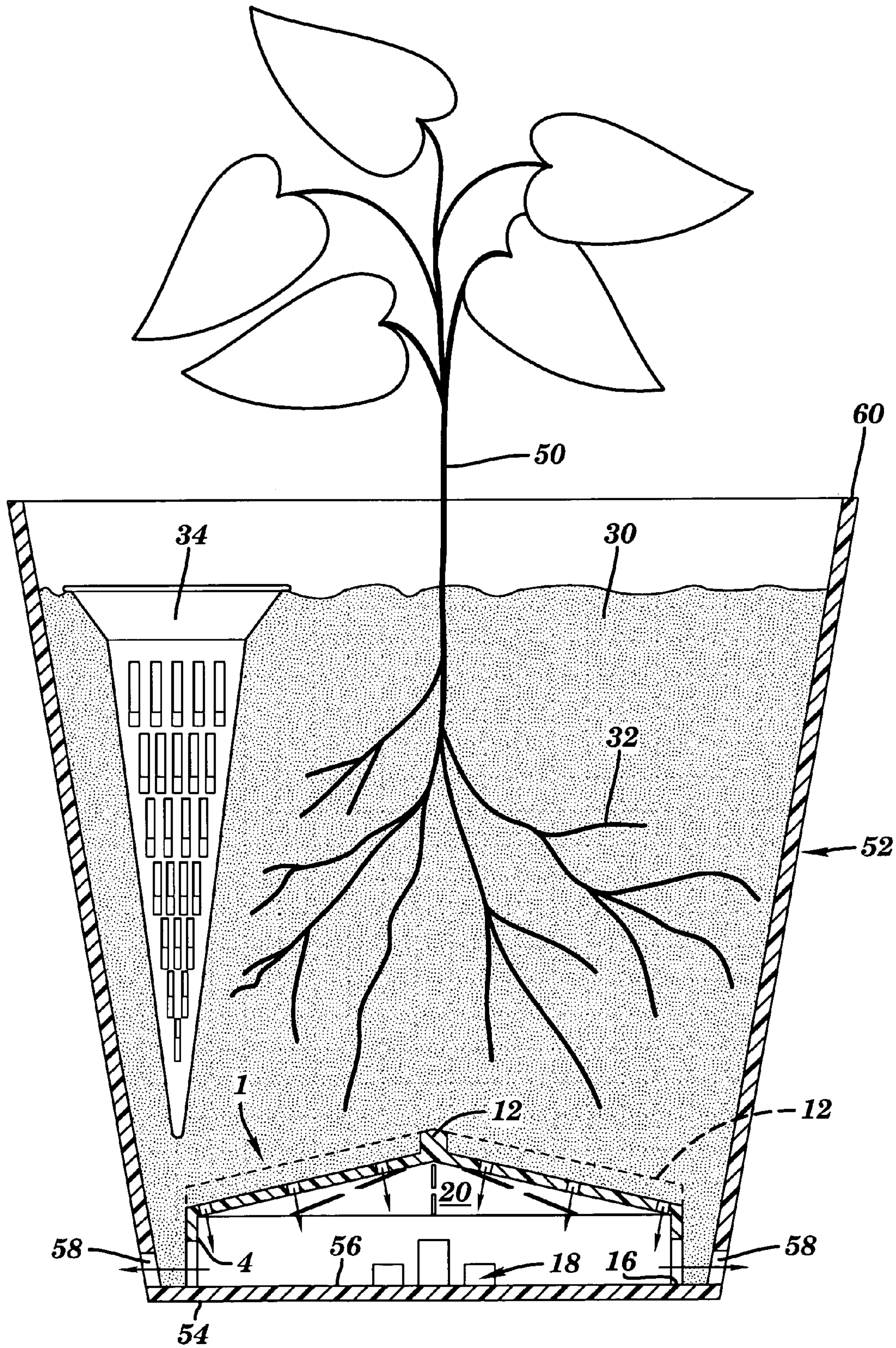
FIG. 5 provides a cross-sectional view of a potted plant, wherein the plate shown in FIG. 1 is located within the pot, and the pot features a plurality of drain holes in its sidewall.

FIG. 5 provides a cross-sectional view of another potted plant 50. Again, the aerated base plate 1 is contained within the plant receptacle 52, and is therefore shown in cross-section. As can be seen in the figure, the plate 1 sits atop the receptacle's flat base 54, with the bottom edge 16 of the plate's sidewall 4 contacting the top surface 56 of the base. The receptacle also contains a quantity of soil 30 located atop the plate's top surface 2, as well as adjacent the plate's sidewall 4. The plant's roots 32 are shown dispersed through the soil. As in the previous figure, an optional watering spike 34 is shown inserted in the soil to enhance the aeration of the soil and to facilitate watering of the plant.

A plurality of drain holes 58 are located in the receptacle's sidewall 60. It should be noted that in this figure, the maximum width/diameter of the plate is less than the maximum width/diameter of the receptacle's interior area in the area adjacent the plate. Alternatively, but not shown, the same plate 1 could be employed in a smaller receptacle of the same type, whereby a gap may not exist between the edge 16 of the plate's sidewall and the receptacle's sidewall.

As in the previous embodiment, when a person waters the plant located within the receptacle 52, the water will initially travel downwardly through the soil. The water located atop the top portion of the plate 1 will pass through the openings 6 and 10 in the plate's top portion and enter the area 20 within the plate. The water will then flow out of the area 20 via the openings 18, pass through the soil located adjacent the plate's sidewall, and then exit the receptacle via the drain holes 58. Any water that flows directly into the soil located adjacent the base plate's sidewall 4 can also exit the receptacle via the drain holes 58.

The aeration/ventilation of the soil within the plant receptacle 52 can follow the same path, or a reverse path, as previously described for the water drainage. For example, the air can enter the pot via the drain holes 58 and then flow into the soil by flowing directly upwardly through the soil located adjacent the plate's sidewall. The air can also enter the area 20 via the openings 18 and then flow upwardly into the soil via openings 6 and 10. It should be noted in this embodiment that while the plate 1 does not overlie the drain holes, its proximity to the drain holes will help to minimize the flow of soil out of the drain holes.

Figure 6:
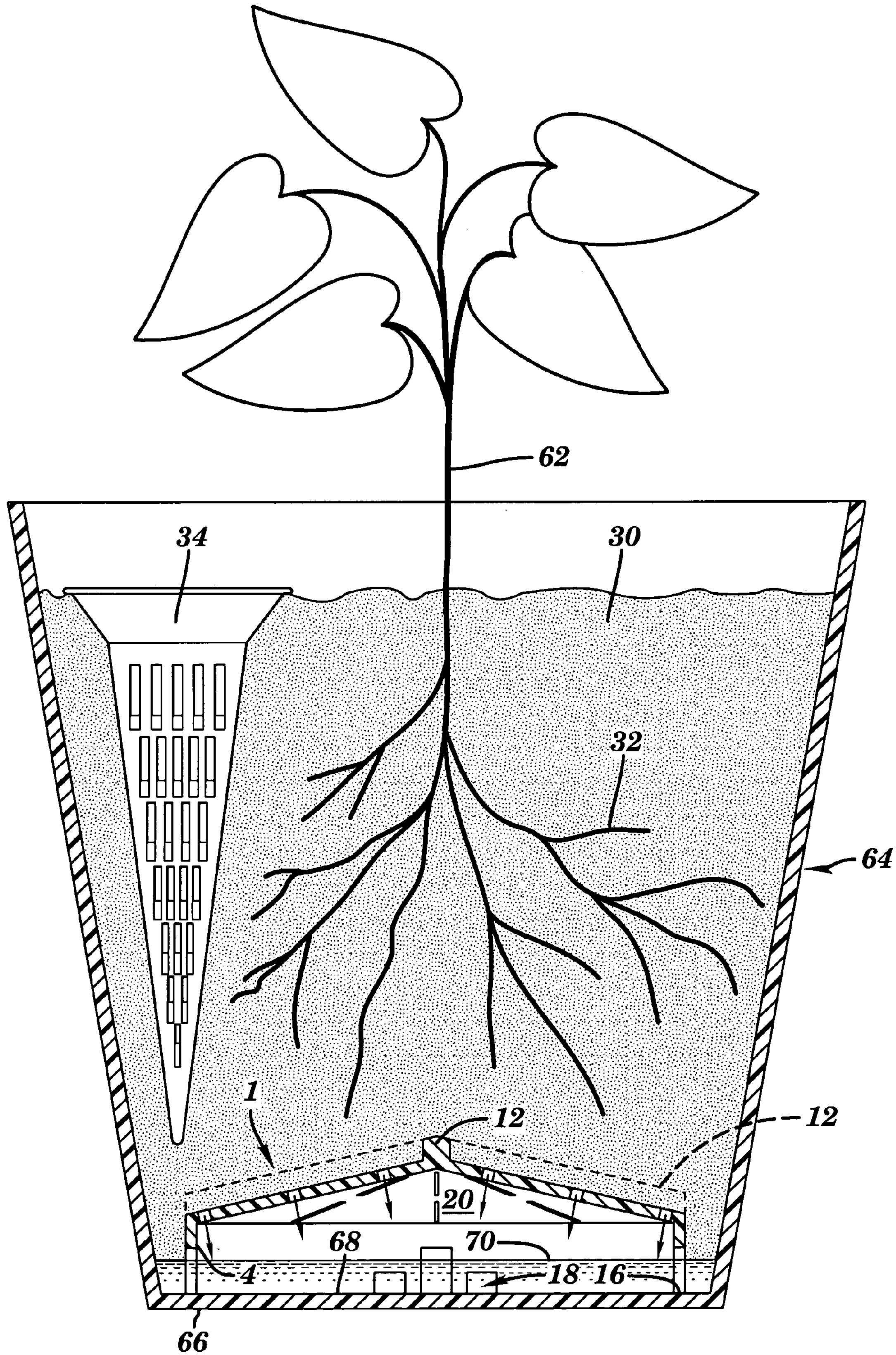
FIG. 6 provides a cross-sectional view of a potted plant, wherein the plate shown in FIG. 1 is located within the pot, and the pot does not feature any drain holes.

FIG. 6 provides a cross-sectional view of another potted plant 62. Again, the aerated base plate 1 is contained within the plant receptacle 64, and is therefore shown in cross-section. As can be seen in the figure, the plate 1 sits atop the receptacle's flat base 66, with the bottom edge 16 of the plate's sidewall 4 contacting the top surface 68 of the base. The receptacle also contains a quantity of soil 30 located atop the plate's top surface 2, as well as adjacent the plate's sidewall 4. The plant's roots 32 are shown dispersed through the soil. As in the previous figure, an optional watering spike 34 is shown inserted in the soil to enhance the aeration of the soil and to facilitate watering of the plant.

It should be noted that in this figure, the maximum width/diameter of the plate is less than the maximum width/diameter of the receptacle's interior area in the area adjacent the plate. Alternatively, but not shown, the same plate 1 could be employed in a smaller receptacle of the same type, whereby a gap may not exist between the edge 16 of the plate's sidewall and the receptacle's sidewall.

In this embodiment, the receptacle does not include any drain holes in its sidewall or base. As a result, any water that is applied to the top of the soil, or into the water spike, will flow downwardly through the soil and collect in the bottom of the receptacle. The water located atop the top portion of the plate 1 will pass through the openings 6 and 10 in the plate's top portion and enter the area 20 within the plate. The figure shows the water attaining a level 70. One should note that the majority of the liquid is located in area 20. Even though there is a gap between the sidewall of the plate 1 and the sidewall of the pot, only a relatively small amount of soil will be located in said gap. In this manner, the amount of soil in continuous contact with the pool of liquid is minimized. The soil in the gap will function to wick the water upwardly into the soil above the liquid level 70.

The aeration/ventilation of the soil within the plant receptacle 64 can follow the same path, or a reverse path, as previously described for the water drainage. In most instances, the area 20 will not be completely filled with liquid. In this manner, some air will be located within the area 20 and act to aerate the soil above the plate.

The preferred embodiment of the invention disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:

1. A base plate designed for placement within a conventional plant receptacle, wherein said plant receptacle is of the type having a substantially planar base and a sidewall that extends upwardly from said base, wherein said base plate is adapted to rest directly on said base and then be covered with soil whereby said base plate would function to improve ventilation and drainage of said soil, said base plate comprising:

- a top portion having a top surface, wherein a plurality of thru-holes extend through said top surface, and wherein said top portion has a perimeter portion; and
- a sidewall that extends downwardly from said perimeter portion of said top portion, wherein a plurality of openings extend through said base plate's sidewall and are sized to prevent any significant passage of said soil while still being capable of allowing fluid flow from a first area located adjacent and exterior to said sidewall of said base plate to a second area located beneath said top portion of said base plate.

2. The base plate of claim 1 wherein a plurality of said openings in said sidewall have a cross-sectional area of less than one-half of a square inch whereby said openings prevent substantial passage of soil therethrough when soil is located adjacent said openings.

3. The base plate of claim 1 wherein said top portion is convex.

4. The base plate of claim 1 wherein said openings in said sidewall have a maximum width of one-quarter of an inch, whereby said openings prevent substantial passage of soil therethrough when soil is located adjacent said openings.

5. The base plate of claim 1 wherein said top portion of said base plate is round and has a diameter of at least three inches.

6. The base plate of claim 1 wherein said plurality of openings in said sidewall comprises four openings that are equidistantly spaced about the sidewall.

7. The base plate of claim 1 wherein said sidewall extends downwardly at an outward angle from the base plate's top portion.

8. The base plate of claim 1 wherein said openings in said sidewall are grouped into a plurality of sets, and wherein said sets are equidistantly spaced along the sidewall.

9. The base plate of claim 8 wherein each set of openings includes three individual openings in a side-by-side relation.

10. A potting system for a plant, said system comprising:

- a plant receptacle having a bottom portion and a sidewall, and wherein said sidewall extends upwardly from a perimeter of said bottom portion and surrounds an interior area;
- a base plate for use within the interior area of said receptacle, said base plate comprising:
  - a top portion having a top surface, wherein a plurality of thru-holes extend through said top surface;
  - a sidewall that extends downwardly from said top portion, wherein a plurality of flow channels extend through said sidewall; and wherein said base plate is sized whereby when said base plate is placed within said receptacle with the top surface of said base plate facing toward a top-located opening of said receptacle, said base plate will rest on an upwardly facing surface of said bottom portion of said receptacle and a gap will exist between at least a portion of said sidewall of said base plate and an adjacent portion of said sidewall of said receptacle, and wherein if said receptacle is then partially filled with a growing medium for plants, said medium will cover said base plate and a significant amount of said medium will at least partially fill said gap and said flow channels in the base plate's sidewall will then be capable of allowing any water located in a first area located exterior and adjacent to the sidewall of said base plate to flow to a second area located beneath the top portion of said base plate.

11. The potting system of claim 10 further comprising a water spike, wherein when a quantity of soil is placed within said receptacle atop said base plate, the water spike can be placed in said soil to facilitate the entry of water and air into said soil.

12. The potting system of claim 10 wherein the bottom portion of the plant receptacle includes a drain hole.

13. The potting system of claim 10 wherein the sidewall of the plant receptacle includes a drain hole.

14. A base plate designed for placement within a plant receptacle whereby when soil is placed within said receptacle, said soil covers and surrounds at least a portion of said base plate whereby said base plate functions to facilitate ventilation and drainage of said soil, said base plate comprising:

- a top portion having a top surface, wherein a plurality of thru-holes extend through said top portion; and
- a wall that extends downwardly from said top portion, wherein said wall includes a plurality of openings, wherein a plurality of said openings are located in groups of at least two openings in a side-by-side relation whereby said openings are capable of allowing water to flow from an area located exterior to said base plate to an area located beneath said top portion of said base plate, and wherein when soil is located adjacent an exterior surface of said wall, said openings in said wall are of a size to substantially prevent any flow of soil therethrough, and wherein by having said grouped openings, drainage is enabled in an area proximate each group even if one of said openings in each group becomes clogged.

15. The base plate of claim 14 wherein a plurality of said openings in said wall have a cross-sectional area no greater than about one-quarter of a square inch.

16. The base plate of claim 14 wherein at least one of said openings in said wall has a width that is no greater than about one-quarter of an inch.

17. The base plate of claim 14 wherein said top portion is convex.

18. The base plate of claim 14 wherein said thru-holes in said top portion have a maximum width of one-eighth of an inch.

19. The base plate of claim 14 wherein said wall extends downwardly at an outward angle from the base plate's top portion.

20. The base plate of claim 14 wherein said groups of openings in said sidewall are equidistantly spaced apart from each other.

21. A potting system for a plant, said system comprising:

a flowerpot adapted to inwardly contain a quantity of soil and a bottom portion of a plant, wherein said flowerpot includes a substantially planar bottom portion and a sidewall, wherein said bottom portion includes a drain hole and wherein said sidewall extends upwardly from a perimeter of said bottom portion and surrounds an interior area;

a base plate for use within the interior area of said flowerpot, wherein when said base plate is located in said flowerpot and said flowerpot is at least partially filled with soil, said base plate will be covered by said soil, said base plate comprising:

a top portion having a top surface, wherein a plurality of thru-holes extend through said top portion; and a sidewall that extends downwardly from said top portion, wherein said sidewall has a bottom edge and a plurality of flow channels that extend through said sidewall, and wherein when said base plate is located within said flowerpot with its top surface facing a top-located opening of said flowerpot and its bottom edge resting on a substantially planar upwardly-facing surface of the flowerpot's bottom portion and said flowerpot is at least partially filled with soil, and if water is then added to said soil, said flow channels and said thru-holes will allow at least a portion of the added water to flow from a first area located exterior to said base plate to a second area located beneath the top portion of said base plate and then out of the flowerpot via said drain hole in the flowerpot's bottom portion.

22. The potting system of claim 21 further comprising a quantity of soil located within the flowerpot, wherein said quantity of soil completely covers the top surface of the base plate, wherein a space exists between at least a portion of the base plate's sidewall and the sidewall of the flowerpot adjacent the base plate, and wherein a significant amount of said quantity of soil is located in said space and abuts said flow channels.

23. The potting system of claim 21 wherein when said base plate is placed within said flowerpot prior to placing said quantity of soil within said flowerpot, the bottom edge of said base plate's sidewall will rest on an upwardly-facing surface of the flowerpot's bottom portion and if said base plate is then centered on said upwardly facing surface, the only contact between said base plate and said flowerpot will be the bottom edge of the base plate's sidewall on the upwardly-facing surface of the flowerpot's bottom portion.

24. The potting system of claim 21 wherein the sidewall of said flowerpot and the sidewall of said base plate both have ring-shaped horizontal cross-sections, wherein the sidewall of said flowerpot proximate the flowerpot's bottom portion has an inner diameter that is greater than an outer diameter of the bottom edge of the sidewall of said base plate, and wherein if said base plate is placed within said flowerpot prior to placing said quantity of soil within said flowerpot and if said base plate is then centered within said flowerpot, the bottom edge of the base plate's sidewall will be visibly spaced away from the sidewall of the flowerpot.

* * * * *